United States Patent
Dunshea et al.

(10) Patent No.: US 9,201,703 B2
(45) Date of Patent: Dec. 1, 2015

(54) SHARING KERNEL SERVICES AMONG KERNELS

(75) Inventors: Andrew Dunshea, Austin, TX (US); Diane G. Flemming, Pflugerville, TX (US)

(73) Assignee: International Business Machines Corporation, Armonk, NY (US)

(*) Notice: Subject to any disclaimer, the term of this patent is extended or adjusted under 35 U.S.C. 154(b) by 2878 days.

(21) Appl. No.: 11/422,656

(22) Filed: Jun. 7, 2006

(65) Prior Publication Data

US 2007/0288941 A1 Dec. 13, 2007

(51) Int. Cl.
G06F 3/00 (2006.01)
G06F 9/44 (2006.01)
G06F 9/46 (2006.01)
G06F 13/00 (2006.01)
G06F 9/50 (2006.01)

(52) U.S. Cl.
CPC .................................. *G06F 9/5077* (2013.01)

(58) Field of Classification Search
CPC .................................................. G06F 9/5077
USPC ......................................... 719/319, 310, 313
See application file for complete search history.

(56) References Cited

U.S. PATENT DOCUMENTS

| | | | | |
|---|---|---|---|---|
| 5,909,545 A | * | 6/1999 | Frese et al. ..................... | 709/208 |
| 6,075,939 A | * | 6/2000 | Bunnell et al. ................. | 717/107 |
| 6,078,929 A | * | 6/2000 | Rao ........................ | 1/1 |
| 6,272,519 B1 | | 8/2001 | Shearer, Jr. | |
| 6,279,046 B1 | * | 8/2001 | Armstrong et al. ............... | 710/5 |
| 6,647,508 B2 | | 11/2003 | Zalewski et al. | |
| 6,691,146 B1 | * | 2/2004 | Armstrong et al. ........... | 718/100 |
| 1,082,006 A1 | | 4/2004 | Ault | |
| 1,082,845 A1 | | 4/2004 | Accapadi | |
| 7,120,753 B2 | | 10/2006 | Accapadi et al. | |
| 7,219,354 B1 | | 5/2007 | Huang et al. | |
| 7,461,148 B1 | | 12/2008 | Beloussov et al. | |
| 2003/0195996 A1 | * | 10/2003 | Jacobs et al. .................. | 709/313 |
| 2003/0233571 A1 | * | 12/2003 | Kraus et al. .................... | 713/200 |
| 2004/0205755 A1 | | 10/2004 | Lescouet et al. | |
| 2004/0226017 A1 | | 11/2004 | Leonard et al. | |

(Continued)

FOREIGN PATENT DOCUMENTS

| | | |
|---|---|---|
| JP | 7056746 | 3/1995 |
| JP | 2002544620 | 12/2002 |

(Continued)

OTHER PUBLICATIONS

Poellabauer et al, "KECho—Event Communication for Distributed Kernel Services", 2002, Georgia Institute of Technology, pp. 1-15.*
Bozman; Process Control Executive—A New Paradigm for Operating System Design; vol. 32; No. 12; May 1990; US.
Aiken; Sharing Data Sets Among Different Program Products That Share the Same Hard Disk; TDBS Sep. 1984; pp. 2105-2109; JP.
Callaghan; NFS Version 3 Protocol Specification; Sun Microsystems, Inc. Jun. 1995; US.
"U.S. Appl. No. 11/301,113 Final Office Action", Apr. 2, 2015, 24 pages.

(Continued)

*Primary Examiner* — Timothy A Mudrick
(74) *Attorney, Agent, or Firm* — DeLizio Law, PLLC (57) ABSTRACT

Sharing kernel services among kernels, including receiving, by a partition manager from an application in a logical partition, a first system call for a kernel service from a first kernel, the first system call having form and content compatible with the first kernel, generating, in dependence upon the first system call, a second system call for the kernel service from a second kernel, the second system call having form and content compatible with the second kernel, and sending the second system call through the partition manager to the second kernel for execution.

15 Claims, 7 Drawing Sheets

(56) References Cited

U.S. PATENT DOCUMENTS

| | | |
|---|---|---|
| 2005/0125486 A1* | 6/2005 | Chrysanthakopoulos et al. .............................. 709/201 |
| 2006/0010446 A1* | 1/2006 | Desai et al. ................... 718/100 |
| 2007/0136721 A1 | 6/2007 | Dunshea et al. |
| 2009/0228882 A1* | 9/2009 | Wang et al. ....................... 718/1 |

FOREIGN PATENT DOCUMENTS

| | | |
|---|---|---|
| JP | 2004535615 | 11/2004 |
| JP | 2005513644 | 5/2005 |

OTHER PUBLICATIONS

"U.S. Appl. No. 11/301,113 Office Action", Oct. 29, 2014, 18 pages.

Janssen, "Virtual Private Server (VPS)", http://www.techopedia.com/definition/4800/virtual-private-server-vps, Copyright © 2010-2015 Janalta Interactive Inc.; accessed from Internet on Apr. 2, 2015, 1 page.

Marron, "Sharing Read-Only Memory Among Multiple Logical Partitions", TBD, Mar. 1993, vol. 36; No. 3.

* cited by examiner

SHARING KERNEL SERVICES AMONG KERNELS

CROSS-REFERENCE TO RELATED APPLICATION

This application is related by inventive entity to the commonly-assigned U.S. patent application Ser. No. 11/301,113 entitled "Sharing A Kernel Of An Operating System Among Logical Partitions", which is hereby incorporated by reference herein in its entirety.

BACKGROUND OF THE INVENTION

1. Field of the Invention

The field of the invention is data processing, or, more specifically, methods, apparatus, and products for sharing kernel services among kernels.

2. Description of Related Art

A thread is a unit of software execution on a multi-threaded computer. That is, a thread is an executable entity of work in a computer system. A thread can be viewed of as a separate stream of executable computer program instructions. On such a computer, software programs are executed in units of execution called 'processes' that include all the processor registers, code segment and offset registers, data segment and offset registers, stack segment and offset registers, flag registers, instruction pointer registers, program counters, and so on, needed for execution of software programs. For efficiency, 'processes' are organized further as threads, where each thread of a process individually possesses all the attributes needed for execution except that a thread shares memory among all the other threads of a process, thereby reducing the overhead of operating system switches from thread to thread ('context switches').

Two modes of multi-threading are discussed in this specification: simultaneous multi-threading ('SMT') and single-threaded ('ST') multi-threading. ST multi-threading is time-multiplexed multi-threading, that is, multi-threading by use of time slices or time quanta. In ST mode, both individual threads and virtual processors are assigned to a portion of a processor's computing capacity apportioned in segments of time, each of which is referred to as a 'time slice' or 'time quantum.'

Some processors accept computer program instructions from more than one thread simultaneously, a feature referred to as 'simultaneous multi-threading' or 'SMT.' The idea behind SMT is to share the processor hardware on a chip among multiple threads of a multi-threaded workload. SMT is a technique that lets multiple independent threads issue instructions to a single physical processor in a single processing cycle. Traditional processor architectures issue instructions to a processor from only one thread at a time. An example of a processor that implements SMT as described here is IBM's Power5™ processor.

SMT is implemented on physical processors each of which is capable of accepting instructions from more than one thread of execution simultaneously. Also in SMT mode, both virtual processors and threads running on virtual processors may be apportioned through time slices. A thread of execution on a virtual processor in SMT mode may be viewed as running on a logical processor. A virtual processor running on a physical processor in SMT mode therefore may be viewed as supporting more than one logical processor. Whether a thread runs in ST mode or in SMT mode, a thread running on a logical processor is unaware of the logical or virtual nature of the processor and views it as a traditional processor.

Multiprocessing is implemented in computers that support multiple logical partitions in ST mode or SMT mode partition-by-partition. Each partition traditionally implements an entire separate operating system including a separate kernel. Kernels support applications running in logical partitions by providing kernel services. Although the types of services provided by kernels are generally similar, different kernels may implement services in different ways. For this reason, some kernels may be better than other kernels at providing certain kernel services. In traditional art, however, a kernel having a superior service cannot share such a service with another kernel—not even with another kernel of the same type. An instance of a Unix kernel, for example, with a superior disk i/o driver traditionally could not make its disk i/o driver available to threads of execution running against another Unix kernel even if the other Unix kernel were of exactly the same type and version.

SUMMARY OF THE INVENTION

Methods, apparatus, and computer program products are disclosed for sharing kernel services among kernels that include receiving, by a partition manager from an application in a logical partition, a first system call for a kernel service from a first kernel, the first system call having form and content compatible with the first kernel, generating, in dependence upon the first system call, a second system call for the kernel service from a second kernel, the second system call having form and content compatible with the second kernel, and sending the second system call through the partition manager to the second kernel for execution.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
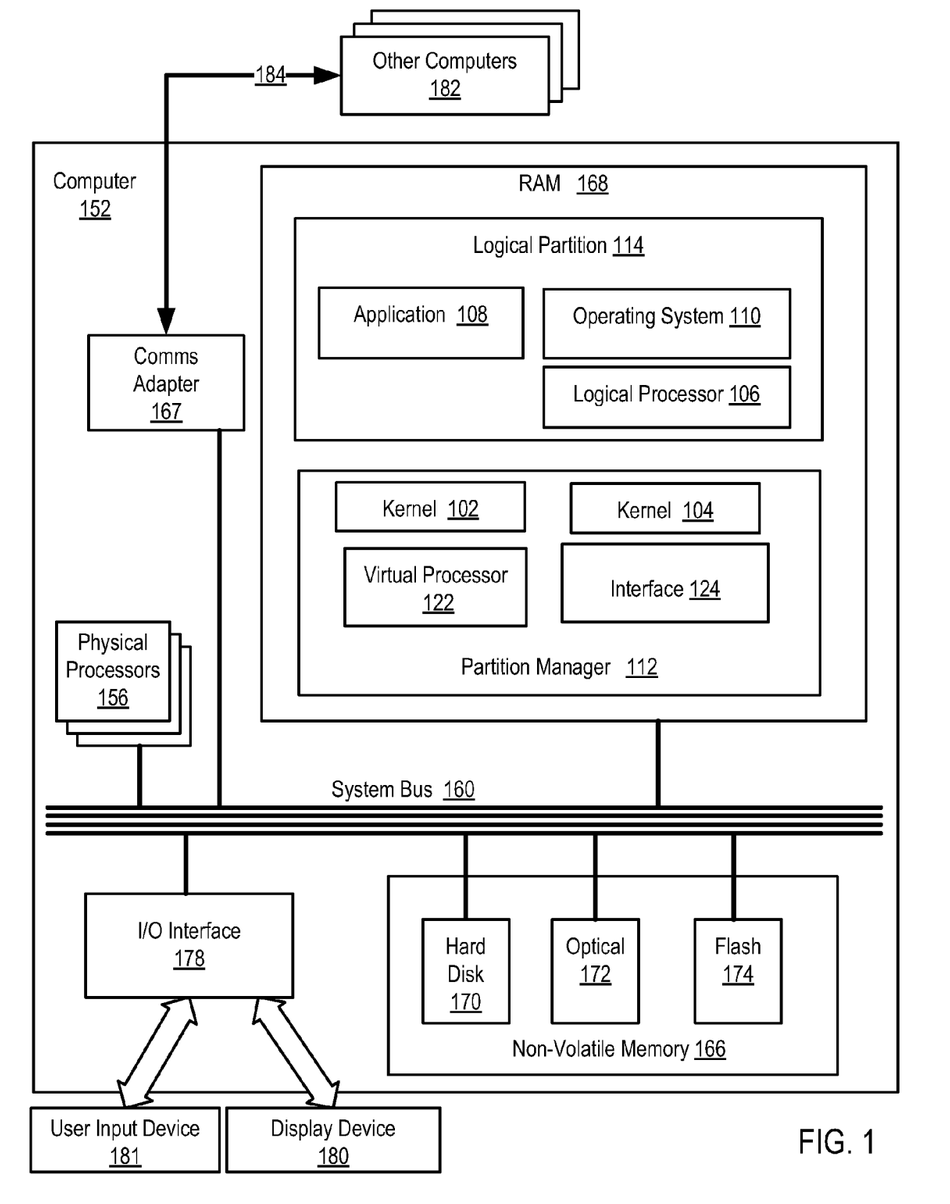
FIG. 1 sets forth a block diagram of automated computing machinery comprising an exemplary computer useful in sharing kernel services among kernels according to embodiments of the present invention.

Exemplary methods, apparatus, and products for sharing kernel services among kernels according to embodiments of the present invention are described with reference to the accompanying drawings, beginning with FIG. 1. Sharing kernel services among kernels in accordance with the present invention is implemented upon automated computing machinery, that is, on one or more computers. FIG. 1 sets forth a block diagram of automated computing machinery comprising an exemplary computer (152) useful in sharing kernel services among kernels according to embodiments of the present invention. The computer (152) of FIG. 1 includes several physical processors (156) as well as random access memory ("RAM") (168) which is connected through a system bus (160) to the physical processors and to other components of the computer.

Stored in RAM (168) is a logical partition (114), an application program (108), an operating system (110), a logical processor (106), a partition manager (112), two or more kernels (102, 104), a virtual processor (122), and kernel sharing interface (124). A logical partition ('LPAR') (114) is a set of data structures and services that enables distribution of computer resources within a single computer to make the computer function as if it were two or more independent computers. Each logical partition is assigned all the resources it needs to operate as though it were an independent computer including, processor time, memory, an operating system, and so on. A logical partition and the resources made available to applications through a logical partition are sometimes referred to collectively as a 'virtual machine.' For convenience of explanation, the system of FIG. 1 includes only one logical partition, but systems that share kernel services among kernels according to embodiments of the present invention may support any number of logical partitions.

An application program (108) is a module of user-level computer program code.

Application programs are non-privileged code that must obtain access to computer resources by calls through to a kernel of an operating system.

An operating system (110) is a layer of system software that schedules threads and provides functions for making system resources available to threads, including memory access, access to input/output resources, and so on. Operating systems also control allocation and authorization for access to computer resources. Operating systems carry out low-level, basic tasks, such as recognizing input from a keyboard, sending output to a display screen, keeping track of files and directories on a disk drive, and controlling peripheral devices such as disk drives and printers. The operating system is also responsible for security, ensuring that unauthorized users do not access the system and that threads access only resources they are authorized to access. Many operating system functions are implemented by a kernel, in this example, a primary kernel (102) or a shared kernel (104). Operating systems useful for sharing kernel services among kernels according to embodiments of the present invention are multi-threading operating systems, examples of which include UNIX™, Linux™, Microsoft XP™, AIX™, IBM's i5/OS™, and others as will occur to those of skill in the art.

A logical processor (106) is an operating system's structure for scheduling threads for execution in a logical partition. That is, rather than scheduling threads for execution on a physical processor or a virtual processor, operating system (110) schedules threads for execution on a logical processor (106). Scheduling a thread on a logical processor provides convenient structure and processing in which the thread appears, from the point of view of the thread, to have at its disposal all the resources of an entire logical partition. Virtual processors are apportioned fractions of a physical processor. A logical processor, however, is logically an entire processor—despite the fact that it is physically running in a fractional time slice just like all other execution on the machine. A thread running on a logical processor in an LPAR appears, therefore, from its point of view, to have all the resources of an entire independent computer. That is, the logical processor is the object upon which a dispatcher in an operating system running in a partition dispatches threads, and a virtual processor is what is dispatched by the partition manager. In an LPAR operating in ST mode, the correspondence between logical processors and virtual processors is one-to-one, one logical processor for each virtual processor. In an LPAR operating in SMT mode, the correspondence between logical processors and virtual processors is N-to-one, where N is the number of logical processors supported on a virtual processor, that is, N logical processors for each virtual processor.

A virtual processor (122) is a subsystem, composed of data structures and computer program instructions, that implements assignment of processor time to a logical partition. A shared pool of physical processors supports the assignment of partial physical processors (in time slices) to a logical partition. Such partial physical processors shared in time slices are referred to as 'virtual processors.' Physical processors held in a shared processing pool are shared among logical partitions. In the examples in this specification, physical processors are shared according to processing units with 1.0 processing units representing the processing capacity of one physical processor. Assigning a thread to run on a virtual processor is typically carried out by assigning the thread to run on a logical processor of a virtual processor. In ST mode, each virtual processor has one logical processor. In SMT mode, however, in these examples, each virtual processor has two logical processors.

The partition manager (112) of FIG. 1 is a layer of system software that runs under logical partitions. That is, a partition manager (112) runs between the logical partitions and underlying computer hardware, physical computer components, including physical processors (156). The partition manager supports and enables establishing and running multiple operating systems and applications in multiple logical partitions. Among other things, the partition manager supports a user's or system administrator's establishing partitions, virtual processors, and logical processors. Just as a kernel of an operating system in a computer that supports multiple logical partitions schedules and dispatches threads on logical processors, the partition manager schedules and dispatches virtual processors on physical processors.

Because an operating system in a logical partition is often used to run a particular application or set of applications, a partition manager makes it possible to run multiple operating systems and their applications in a single computer, reducing overall hardware costs. Production and test systems can run at the same time in the same hardware. In addition, with a partition manager supporting multiple logical partitions, different operating systems such as Windows™ and Linux™ can share the same underlying computer hardware. A partition manager is the kind of software sometimes referred to as a 'hypervisor,' a 'virtualization manager,' or a 'virtual machine monitor.'

In the example of FIG. 1, partition manager (112) includes kernels (102, 104). A kernel is the core of an operating system. A kernel is the privileged module or modules sometimes also known as a 'system executive' or 'system monitor.' The kernel is the software responsible for providing secure access to computer system hardware on behalf of threads of execution in applications and in other operating system components—including access to memory, processing capacity, input/output resources, and so on. The kernel also schedules threads of execution that make up application programs as well as operating system processes. The kernel also typically provides services for interprocess communications and synchronization such as memory locks, signals, and semaphores. Kernels typically also provide hardware abstraction—a set of instructions universal to all devices of a certain type—to hide the underlying complexity from applications and from other components of an operating system. Hardware abstraction components in turn rely upon software drivers to provide functions specific to a hardware device's manufacturing specifications. In summary, the kernel provides kernel services that:

- control and mediate access to system hardware;
- implement and support fundamental abstractions: processes, threads, files, devices, and so on;
- allocate and schedule system resources: memory, processors, disks, file descriptors, process descriptors, thread descriptors, and so on;
- enforce security and protection of system resources; and
- respond to user and application requests for service through system calls.

Readers of skill in the art will recognize that operating system kernels (102, 104), which would traditionally be installed inside an operating system, in this example are installed in a partition manager (112), so that system calls from application programs for kernel services are vectored through the partition manager. Installing a kernel in a partition manager conserves system resources by allowing more than one logical partition to use the same instance of a kernel. Installing kernels in partition managers is described in detail in the U.S. patent application Ser. No. 11/301,113 entitled "Sharing A Kernel Of An Operating System Among Logical Partitions", referenced above, and incorporated by reference herein in its entirety.

In the example computer of FIG. 1, partition manager (112) exposes kernel sharing interface (124). Kernel sharing interface (124) is an application programming interface or 'API,' a computer software module implemented, for example, as a library of computer program instructions, configured to facilitate sharing kernel services among kernels according to embodiments of the present invention. Kernel sharing interface (124) includes computer program instructions capable of receiving from an application (108) in a logical partition (114), a first system call for a kernel service from a first kernel (102), generating, in dependence upon the first system call, a second system call for the kernel service from a second kernel (104), and sending the second system call through the partition manager (112) to the second kernel (104) for execution. Kernel sharing interface (124) in this example also includes computer program instructions capable of receiving a response from kernel (104), which provides the kernel service, and sending a response to the application (108) in the logical partition (114). Kernel sharing interface (124) may include computer program instructions capable of ensuring that the response has form and content compatible with the first kernel (102).

The computer software components, application (108), logical partition (114), logical processor (106), operating system (110), partition manager (112), virtual processor (122), kernels (102, 104), and so on, in the example of FIG. 1 are shown disposed in RAM (168). Readers will recognize, however, many components of such software may be stored in non-volatile memory (166) also. Computer (152) of FIG. 1 includes non-volatile computer memory (166) coupled through a system bus (160) to physical processors (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as other kinds of non-volatile memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out, for example, through data communications networks such as IP networks—and in other ways as will occur to those of skill in the art. Communications adapters implement the hardware level of data communications through which one computer sends data communications to another computer, directly or through a network. Examples of communications adapters useful for sharing kernel services among kernels according to embodiments of the present invention include modems for wired dial-up communications, Ethernet (IEEE 802.3) adapters for wired network communications, and 802.11b adapters for wireless network communications.

Figure 2:
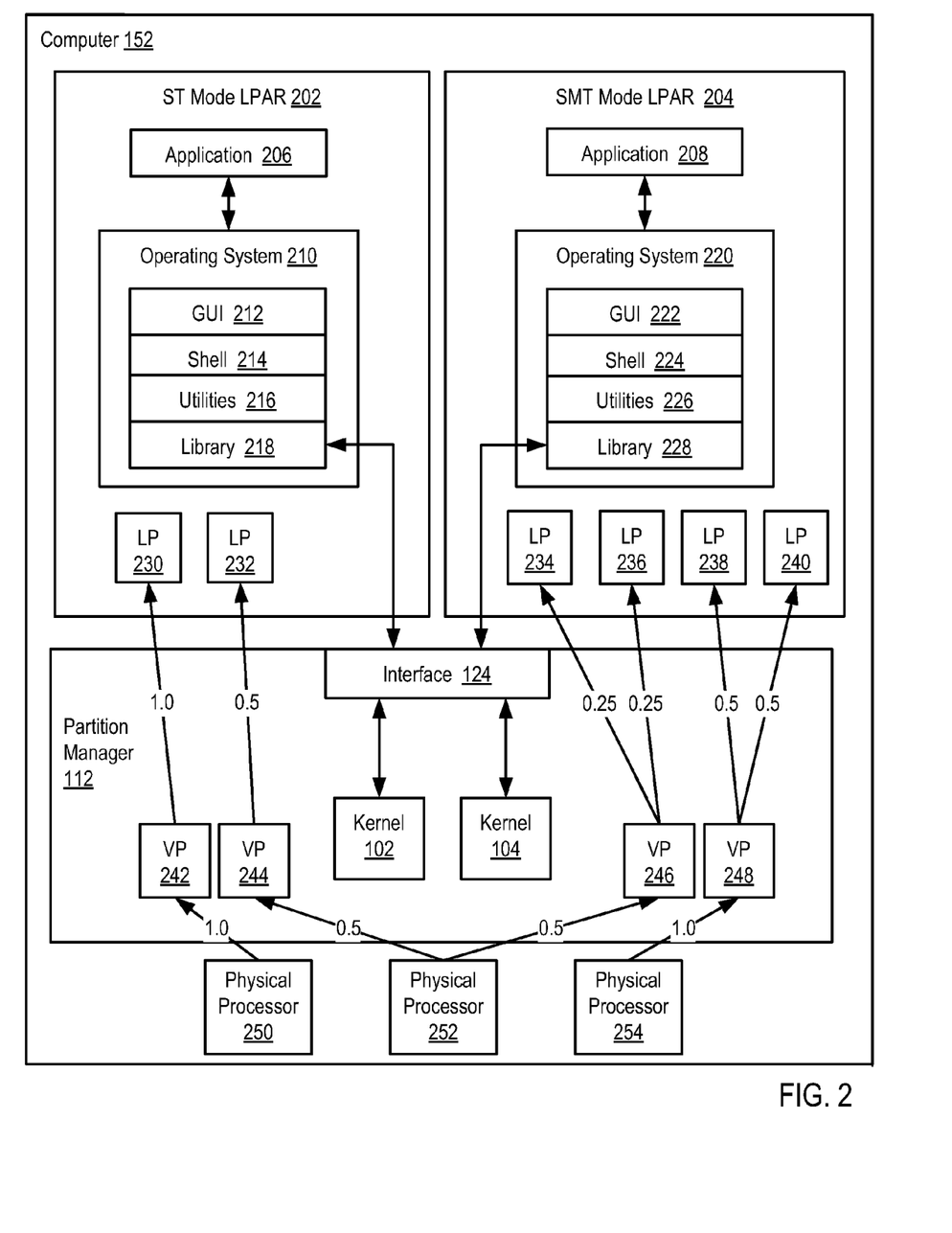
FIG. 2 sets forth a functional block diagram illustrating an exemplary system for sharing kernel services among kernels according to embodiments of the present invention.

For further explanation, FIG. 2 sets forth a functional block diagram illustrating an exemplary system for sharing kernel services among kernels according to embodiments of the present invention. The system of FIG. 2 includes two logical partitions, one in ST mode (202) and one in SMT mode (204). The system of FIG. 2 includes six logical processors, two (230, 232) for logical partition (202) and four (234, 236, 238, 240) for logical partition (204). The system of FIG. 2 also includes four virtual processors, two (242, 244) assigned to logical partition (202) and two (246, 248) assigned to logical partition (204). The system of FIG. 2 also includes three physical processors (250, 252, 254). In this example, the processing capacity of the three physical processors (250, 252, 254) is apportioned to the logical partitions as follows:

- All of the processing capacity of physical processor (250) is assigned entirely to virtual processor (242), so that logical processor (230) has available to it the entirety of physical processor (250).
- One-half the processing capacity of physical processor (252) is assigned to virtual processor (244), so that logical processor (232) has available to it in time slices one-half of physical processor (252).
- One-half the processing capacity of physical processor (252) is assigned to virtual processor (246). Virtual processor (246) is assigned to logical partition (204) which runs in SMT mode with two logical processors (234, 236) for virtual processor (246). Logical processor (234)

and logical processor (236) each has available to it in time slices one-fourth of the processing capacity of physical processor (252).

All of the processing capacity of physical processor (254) is assigned to virtual processor (248). Virtual processor (248) is assigned to logical partition (204) which runs in SMT mode with two logical processors (238, 240) for virtual processor (248). Logical processor (238) and logical processor (240) each has available to it in time slices one-half of the processing capacity of physical processor (254).

The system of FIG. 2 includes a partition manager (112). The partition manager is a layer of system software that runs under logical partitions. That is, a partition manager (112) runs between the logical partitions and underlying computer hardware, physical computer components, including physical processors (250, 252, 254). The partition manager supports and enables establishing and running multiple operating systems and applications in multiple logical partitions. Among other things, the partition manager supports a user's or system administrator's establishing partitions, virtual processors, and logical processors. Just as a kernel of an operating system in a computer that supports multiple logical partitions schedules and dispatches threads on logical processors, the partition manager schedules and dispatches virtual processors on physical processors. Because an operating system in a logical partition is often used to run a particular application or set of applications, a partition manager makes it possible to run multiple operating systems and their applications in a single computer, reducing overall hardware costs. Production and test systems can run at the same time in the same hardware. In addition, with a partition manager supporting multiple logical partitions, different operating systems such as Windows™ and Linux™ can share the same underlying computer hardware.

In the example of FIG. 2, partition manager (112) includes kernel sharing interface (124). Kernel sharing interface (124) is an application programming interface or 'API,' a computer software module implemented, for example, as a library of computer program instructions, configured to facilitate sharing kernel services among kernels according to embodiments of the present invention. Kernel sharing interface (124) includes computer program instructions capable of receiving from an application (206, 208) in a logical partition (202, 204), a first system call for a kernel service from a first kernel (102), generating, in dependence upon the first system call, a second system call for the kernel service from a second kernel (104), and sending the second system call through the partition manager (112) to the second kernel (104) for execution. Kernel sharing interface (124) may further include computer program instructions capable of receiving a response from kernel (104) which provides the kernel service, and sending a response to the application (206, 208) in the logical partition (202, 204) that sent the first system call. Kernel sharing interface (124) may include computer program instructions capable of ensuring that the response has form and content compatible with the first kernel (102).

The system of FIG. 2 includes two operating systems (210, 220), one each in logical partition (202) and logical partition (204) respectively. In this example, operating system features directly accessible to applications or users remain in the logical partitions, while the operating system kernels (102, 104) are installed in partition manager (112). Such features include support for graphical user interfaces ('GUIs') (212, 222). Such features also include support for shells (214, 224) that provide, for example, command line interfaces to operating system utilities and library functions. Operating system features directly accessible to applications or users also include system utilities (216, 226). System utilities include programs for system management that are typically accessible through a GUI or a shell such as, for example, programs to create, open, or delete files, programs to create and navigate directories of a file system, programs to read and set environment variables, search for text inside a file, and so on.

Operating system features directly accessible to applications or users may include and may be implemented as libraries of system calls (218, 228). System call libraries expose application programming interfaces ('APIs') that allow calling programs to gain access to hardware-dependent services and other protected system resources by calls into privileged software routines inside a kernel (102, 104). Such calls to privileged code in kernel space are effected by interrupts or software traps called from within functions of the system call libraries. Access to function calls within system call libraries typically is effected by compiling one or more system call libraries into an application or utility or into another library that is dynamically loadable at run time—a dynamically linked library or 'DLL.'

Figure 3A:
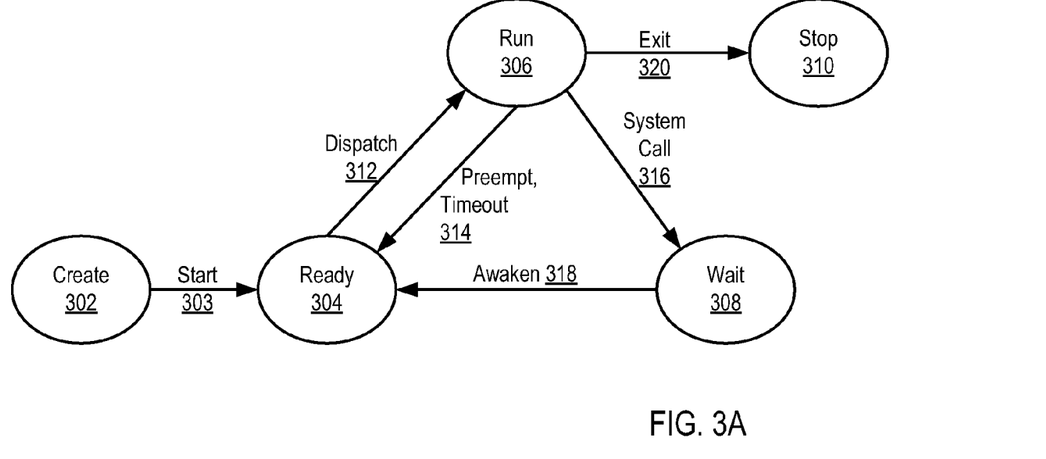
FIG. 3A sets forth a state diagram illustrating exemplary thread states for sharing kernel services among kernels according to embodiments of the present invention.

For further explanation, FIG. 3A sets forth a state diagram illustrating exemplary thread states for sharing kernel services among kernels according to embodiments of the present invention. The bubbles in FIG. 3A represent thread states. The arrows between the bubbles represent state transitions effected by kernel functions. The thread states represented in FIG. 3A include a create state (302), a ready state (304), a run state (306), a wait state (308), and a stop state (310). A thread resides temporarily in the create state (302) when the thread is first created at the request of another thread, to give the kernel time to gather information and resources for the thread. As soon as the kernel prepares the thread to run, it is 'started' (303), that is, moved to the ready state (304).

Threads in the ready state (304) are queued, in a ready queue (not shown) waiting for an opportunity to run. The process of determining which ready thread will run next is called 'scheduling.' There are many scheduling algorithms, FIFO, Round Robin, Priority, and so on, and any of them may be used in a system that shares kernel services among kernels according to embodiments of the present invention. The kernel function for moving a thread from ready state to run state is called 'dispatching' (312). In fact, 'dispatched,' 'running,' and 'in run state,' are generally synonymous.

When a thread is dispatched, that is, in run state (306), the thread is presently assigned to execute on a logical processor. Whether the thread is physically executing depends on whether the logical processor's virtual processor is currently dispatched through its partition manager, that is, currently executing in a time slice on a physical processor. A ready queue for a logical processor may contain one, two, or more threads in ready state waiting to run on the logical processor. Only one thread at a time is ordinarily placed in run state on a logical processor.

Threads can lose possession of the logical processor, be removed from run state to ready state, by preemption or time out (314). A thread is preempted when a thread having a higher priority enters the ready queue for the logical processor. A thread times out if it retains possession of the logical processor, that is, remains in run state, through its entire time slice.

A thread also may leave run state (306) by issuing a system call (316) and entering wait state (308)—to wait for completion of the system call. Such system calls may be requests for any service provided by a kernel, including for example, intentional requests to sleep or wait for a certain period of time, requests for data to be read from or written to disk, requests for data to be read from or written to input/output resources, and so on.

Figure 3B:
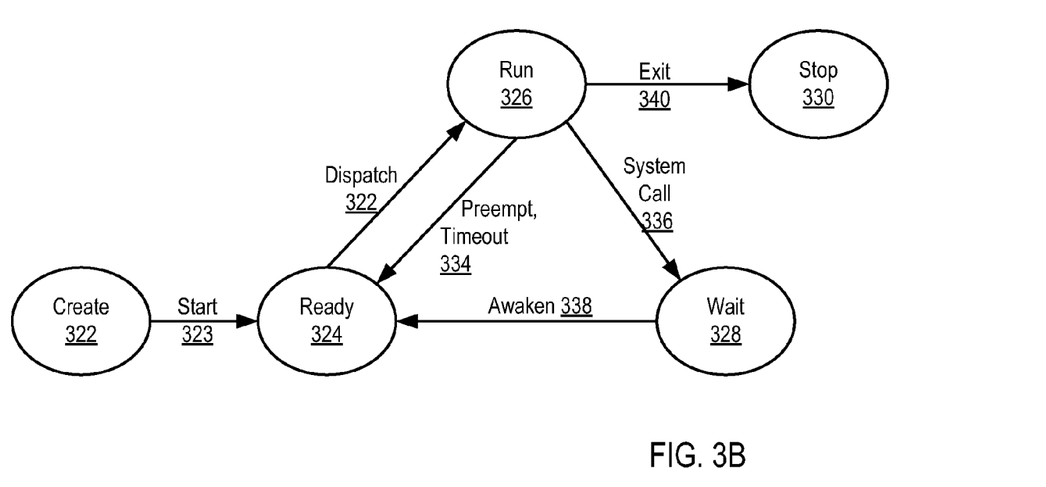
FIG. 3B sets forth a state diagram illustrating exemplary virtual processor states for scheduling virtual processors in a computer system that shares kernels according to embodiments of the present invention.

For further explanation, FIG. 3B sets forth a state diagram illustrating exemplary virtual processor states for scheduling virtual processors in a computer system that shares kernels according to embodiments of the present invention. The bubbles in FIG. 3B represent virtual processor states. The arrows between the bubbles represent state transitions effected by functions of a partition manager. The virtual processor states represented in FIG. 3B include a create state (322), a ready state (324), a run state (326), a wait state (328), and a stop state (330). A virtual processor resides temporarily in the create state (322) when the virtual processor is first created, typically at boot time, to give the partition manager time to gather information and resources for the virtual processor. As soon as the partition manager prepares the virtual processor to run, the virtual processor is 'started' (323), that is, moved to the ready state (324).

Virtual processors in the ready state (324) are queued in a ready queue (not shown) waiting for an opportunity to run. A partition manager schedules virtual processors to run, according to one or more scheduling algorithms, Round Robin, Priority, and so on. The partition manager dispatches (322) from the ready state to the run state the single virtual processor from the ready queue presently most qualified for actual possession of the physical processor to which the virtual processor is assigned. Only one virtual processor at a time is ordinarily placed in run state on a physical processor.

Virtual processors can lose possession of the physical processor and be removed from run state to ready state by preemption or by time out (334). A virtual processor is preempted when a virtual processor having a higher priority enters the ready queue for the physical processor. A virtual processor times out if it retains possession of the physical processor, that is, remains in run state, through its entire time slice.

A virtual processor also may leave run state (326) by issuing a system call (336) and entering wait state (328)—to wait for completion of the system call. Such system calls include intentional requests to sleep or wait for a certain period of time, requests for data to be read from or written to disk, requests for data to be read from or written to input/output resources, and so on. When a thread running on a virtual processor, that is, running on a logical processor of a logical partition, issues a system call to wait for keyboard input or to read a file from disk, for example, the virtual processor may determine that there is no need for the virtual processor to continue to occupy the physical processor merely to do nothing until a keystroke arrives or the disk read completes. In this circumstance, the virtual processor may put itself to sleep for a certain period off time, a tenth of a second for example. Returning the virtual processor from wait state to ready state is referred to as 'awakening' (338) the virtual processor.

Figure 4A:
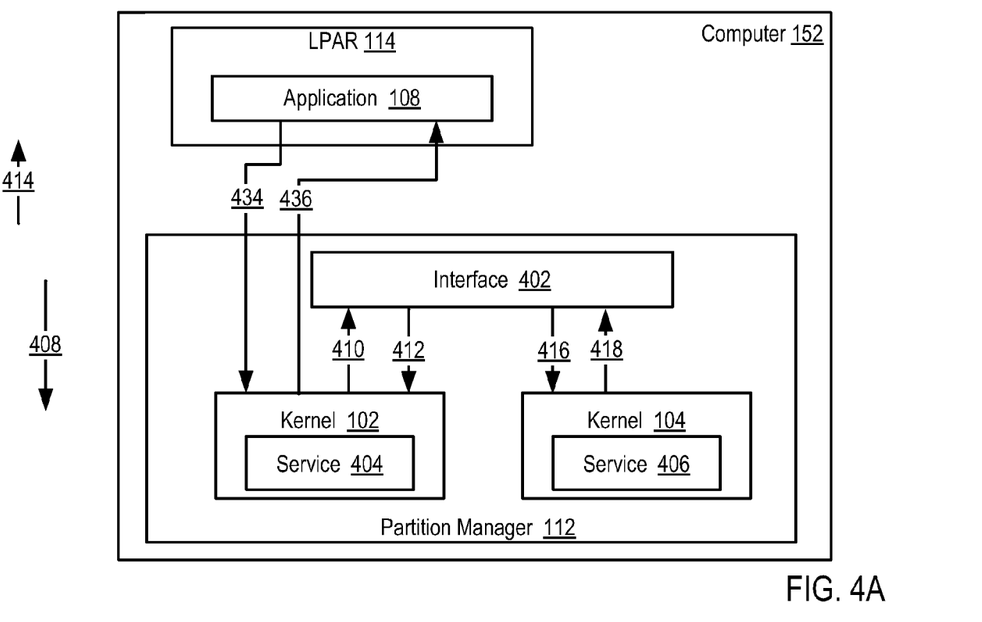
FIG. 4A sets forth a functional block diagram illustrating a further exemplary system for sharing kernel services among kernels according to embodiments of the present invention.

For further explanation, FIG. 4A sets forth a functional block diagram illustrating a further exemplary system for sharing kernel services among kernels according to embodiments of the present invention. The system of FIG. 4A includes logical partition (114) running application (108), partition manager (112), kernels (102, 104), which share kernel services (404, 406), and kernel sharing interface (402), all running in computer (152).

In the system of FIG. 4A, application (108) sends a system call to a kernel (102) in partition manager (112) through kernel sharing interface (402). Kernel sharing interface (402) is a software module of partition manager (112) that directs communications to and from kernels (102, 104) in the partition manager, and transforms the communications to appropriate form and content for the recipient. In this example, application program (108) effects a system call (434) to kernel (102) for kernel service (404), a kernel service that kernel (102) is configured to obtain from kernel (104). The system call (434) is interrupt-vectored through partition manager (112) to kernel (102). Kernel (102) receives the system call, which has form and content (parameter values and parameter sequence) compatible with kernel (102), and determines that the kernel service requested by the system call is to be provided by the second kernel (104). Kernel (102) sends (410) the system call for the kernel service to be provided by kernel (104) to kernel sharing interface (402) with instructions to send the system call to kernel (104).

In response to the instruction from kernel (102) to send the system call to kernel (104), kernel sharing interface (402) generates a second system call for the kernel service from kernel (104). Kernel sharing interface (402) generates the system call to kernel (104) with form and content (parameter values and parameter sequence) compatible with kernel (104). Kernel sharing interface (402) sends (416) the second system call to kernel (104) for execution.

Kernel (104) provides kernel service (406) in response to receiving the second system call. If the kernel service (406) generates a response, kernel (104) sends (418) the response to kernel sharing interface (402). The response generated by kernel (104) has form and content compatible with kernel (104).

Upon receiving the response from kernel (104), kernel sharing interface (402) generates a second response. The second response generated by kernel sharing interface (402) has form and content compatible with kernel (102). Kernel sharing interface (402) sends (412) the second response to kernel (102). Kernel (102) returns (436) the second response to the calling application (108).

Figure 4B:
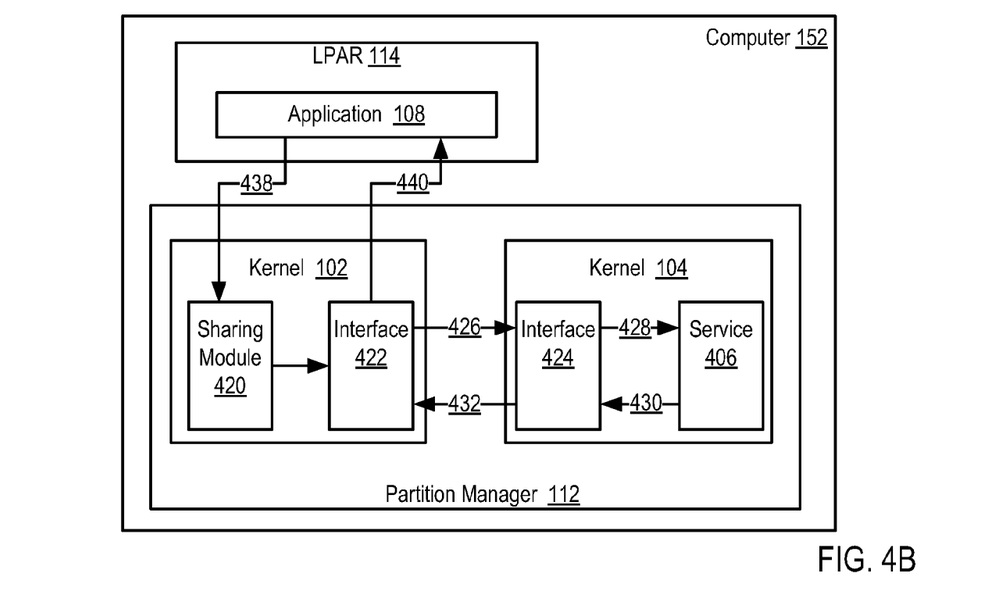
FIG. 4B sets forth a functional block diagram illustrating a further exemplary system for sharing kernel services among kernels according to embodiments of the present invention.

For further explanation, FIG. 4B sets forth a functional block diagram illustrating a further exemplary system for sharing kernel services among kernels according to embodiments of the present invention. The system of FIG. 4B includes logical partition (114) running application (108), partition manager (112), and kernels (102, 104), which share kernel service (406), all running in computer (152).

In the system of FIG. 4B, application (108), sends (438) a system call to a kernel (102) in partition manager (112). Kernel (102) includes a sharing module (420) and a kernel sharing interface (422). Sharing module (420) is a software module of kernel (102) that determines whether a kernel service called in a system call is to be provided by another kernel. Kernel sharing interface (422) is a software module of kernel (102) that directs communications to and from kernels (102, 104), and transforms the communications to appropriate form and content for the recipient of the communications. Sharing module (420) determines whether the system call received from application (108) requests a kernel service to be provided by the second kernel (104). If the system call received from application (108) includes a call for a kernel service to be provided by the second kernel (104), kernel sharing interface (422) generates a second system call with form and content compatible with the second kernel (104). Kernel sharing interface (422) sends (426) the second system call to kernel (104).

In the example of FIG. 4B, kernel (104) includes kernel sharing interface (424). Kernel sharing interface (424) calls (428) the kernel service (406) and receives (430) a response from the kernel service (406), if the kernel service generates a response.

The response generated by kernel service (406) has form and content compatible with kernel (104). Kernel sharing interface (424) generates a second response with form and content compatible with kernel (102). Kernel sharing interface (424) sends (432) the second response to kernel (102). Kernel (102) receives the second response and returns (440) it to the calling application (108).

Figure 5:
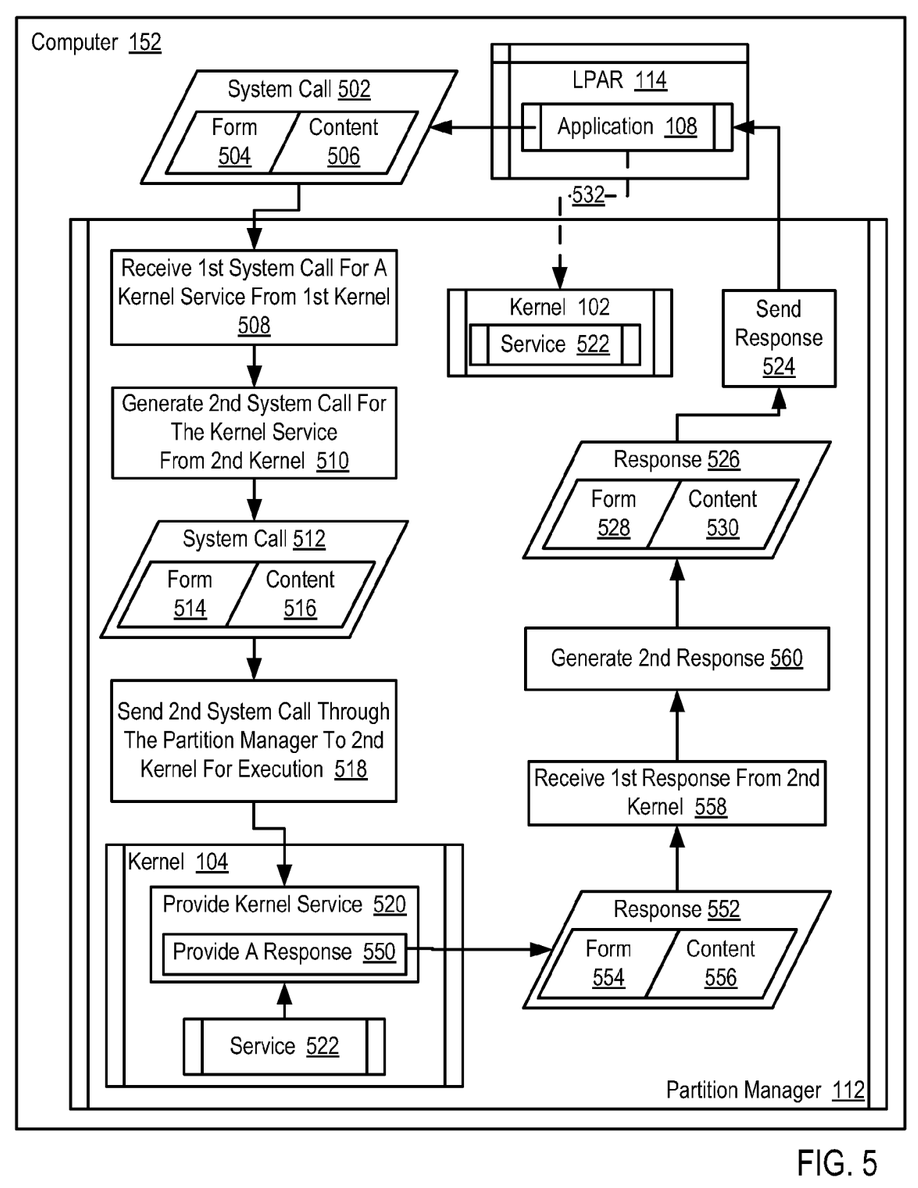
FIG. 5 sets forth a flow chart illustrating an exemplary method for sharing kernel services among kernels according to embodiments of the present invention.

For further explanation, FIG. 5 sets forth a flow chart illustrating an exemplary method for sharing kernel services among kernels according to embodiments of the present invention. The method of FIG. 5 may be carried out in a computer (152) having one or more logical partitions (114), one or more applications (108) running in the one or more logical partitions (114), a partition manager (112), and two or more kernels (102, 104) in the partition manager (112). In the example of FIG. 5, partition manager (112) assigns resources to logical partitions as the logical partitions are booted. At boot time for logical partition (114), the partition manager (112) assigned first kernel (102) as a resource for the logical partition (114) to provide kernel services to application (108) running in the logical partition (114).

The method of FIG. 5 includes receiving (508), by the partition manager (112) from an application (108) in a logical partition (114), a first system call (502) for a kernel service (522) from a first kernel (102). In the example of FIG. 5, a system call is an instruction issued by an application or by an application through a function of a system call library to a kernel to execute a kernel service.

The first system call (502) has form (504) and content (506) compatible with the first kernel (102). In the example of FIG. 5, the form (504) of system call (502) is the sequence of call parameters, and the content (506) of a system call (502) is the identity of the system call and the values of the call parameters. The identity of the system call may be represented by a name for the system call or by the value of an interrupt vector. The form and content of system call (502) are compatible with the first kernel (102) because, from the perspective of the application (108), the logical partition (114) appears to be an entire computer with only kernel (102) to provide kernel services. Application (108) and logical partition (114) are unaware of any kernel other than kernel (102); application (108) and logical partition (114) therefore provide system calls to kernel (102) with form and content compatible with kernel (102).

The method of FIG. 5 also includes generating (510), in dependence upon the first system call (502), a second system call (512) for the kernel service (522) from a second kernel (104). The second system call (512) has form (514) and content (516) compatible with the second kernel (104). In the example of FIG. 5, generating (510) a second system call (512) for the kernel service (522) from a second kernel (104) is carried out by partition manager (112). Partition manager (112) may generate the second system call, for example, by use of a data structure such as the one illustrated as Table 1:

TABLE 1

| Logical Partition | Primary Kernel | Shared Kernel | Received Call | Generated Call |
|---|---|---|---|---|
| 114 | 102 | 104 | F(x, y, z) | F(y, x, z) |
| 114 | 102 | 104 | G(, , w) | M(w) |
| 114 | 102 | 104 | A( ) | B( ) |
| 114 | 102 | 104 | C(q, r) | C(t, r) |

Each record of Table 1 associates a logical partition identifier, a primary kernel identifier, a shared kernel identifier, and a received system call to a generated system call that specifies form and content of a system call to be sent to the shared kernel. In Table 1, received calls have both a form, e.g., the parameters specified in the call and their order, and content, e.g., the keyword used to invoke a function and the value of the parameters. In the first record of Table 1, for example, the form of the received call includes parameters "x, y, z" in that order and the content includes command keyword "F" and the values of x, y, and z. In the example of FIG. 5, kernel (102) is the primary kernel, because it is the kernel assigned to provide kernel services to the logical partition (114). Kernel (104) is the shared kernel in the example of FIG. 5, because it is the kernel sharing one of its services. System call (502) is the received call in the example of FIG. 5, and second system call (512) is the generated call. The partition manager, upon receiving a system call from an application in a logical partition, may, by use of the primary kernel identifier associated with the logical partition, lookup in a data structure, such as Table 1, the received system call to identify the form and content required for the generated system call. The partition manager may then generate the second system call by forming an instruction with the appropriate keywords, parameters, etc. to give the second system call form and content compatible with the shared kernel.

The method of FIG. 5 also includes sending (518) the second system call (512) to the second kernel (104) for execution. In the example of FIG. 5, the partition manager (112), having generated the second system call (512), sends the system call to the second kernel (104). The partition manager may identify the second kernel (104) by reference to a data structure such as Table 1. In the first record of Table 1, for example, the shared kernel for a system call received from a logical partition with logical partition identifier '114' to a primary kernel with primary kernel identifier '102' having form and content 'F(x, y, z)' corresponds to a shared kernel with a shared kernel identifier of '104'. The partition manager in this example, therefore, generates a call with form and content 'F(y, x, z)' and sends the generated call to kernel (104) for execution. Sending (518) the second system call (512) to the second kernel (104) for execution may be carried out by use of a kernel sharing interface as described above with regard to references (124, 402, 422, 424) on FIGS. 2, 4A, and 4B.

The method of FIG. 5 also includes providing (520), by the second kernel (104), the kernel service (522). The second kernel (104) in the example of FIG. 5, provides the kernel service by executing the second system call (512) with parameters specified by the content (516) of the second system call (512).

The method of FIG. 5 also includes providing (550) a response to the second system call (512) as part of providing (520) the kernel service (522). Kernel (104) may provide a response as part of providing a kernel service, if, for example, the kernel service (522) generates a response. Persons of skill in the art, having benefit of the present specification, will recognize that not all kernel services generate a response to a system call. Kernel services that do not provide a response are, nevertheless, within the scope of the present invention.

In the method of FIG. 5, the response (552) provided by kernel (104) has form (554) and content (556) compatible with kernel (104). In the method of FIG. 5, kernel (104) provides the response (552) as though second system call (512) were a system call from an application using kernel (104) to provide kernel services. Kernel (104) provides a response (552), therefore, that has the form (554) and content (556) that an application using kernel (104) for kernel services would expect in a response from kernel (104), i.e., a response with form and content compatible with kernel (104).

The method of FIG. 5 also includes receiving (558) the first response (552) from kernel (104) and generating (560) a second response (526). In the example of FIG. 5, the partition manager (112) receives (558) the response from kernel (104) and generates (560) the second response (526). The second response (526), generated by the partition manager (112), has form (528) and content (530) compatible with kernel (102). The second response (526) has form (528) and content (530) compatible with kernel (102) because application (108) is expecting a response to system call (502) to come from kernel (102), and therefore to have form and content compatible with kernel (102).

The method of FIG. 5 also includes sending (524) a response (526) to the application (108) in the logical partition (114). In the example of FIG. 5, sending (524) response (526) to the application (108) in the logical partition (114) is carried out by partition manager (112). From the perspective of application (108), it appears that kernel (102) provided the kernel service (522).

Figure 6:
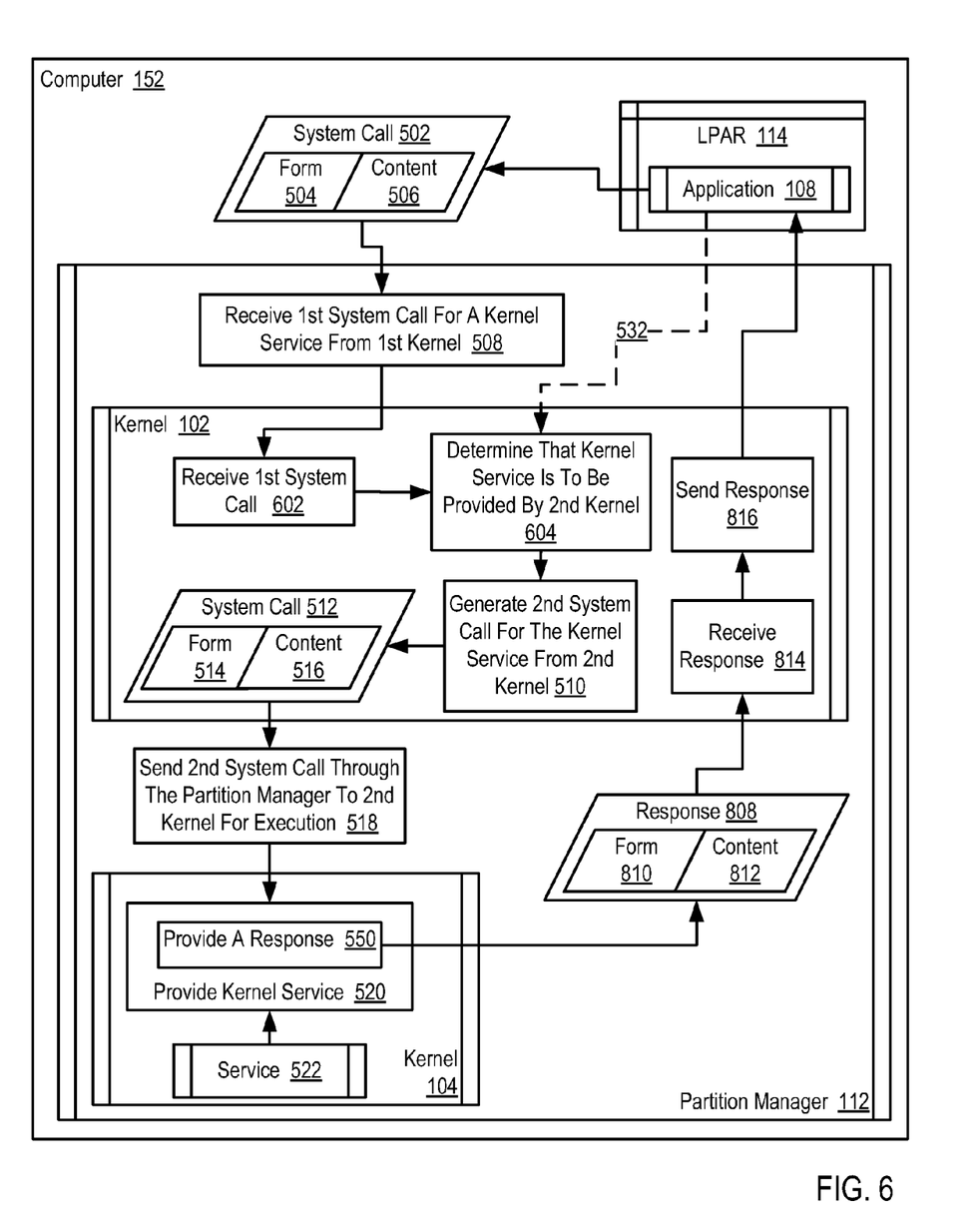
FIG. 6 sets forth a flow chart illustrating a further exemplary method for sharing kernel services among kernels according to embodiments of the present invention.

For further explanation, FIG. 6 sets forth a flow chart illustrating a further exemplary method for sharing kernel services among kernels according to embodiments of the present invention. The method of FIG. 6 is similar to the method of FIG. 5. That is, the method of FIG. 6 includes receiving (508), by the partition manager (112) from an application (108) in a logical partition (114), a first system call (502) for a kernel service (522) from a first kernel (102), the first system call having form (504) and content (506) compatible with the first kernel (102). Like the method of FIG. 5, the method of FIG. 6 includes generating (510), in dependence upon the first system call (502), a second system call (512) for the kernel service (522) from a second kernel (104), where the second system call (512) has form (514) and content (516) compatible with the second kernel (104). Like the method of FIG. 5, the method of FIG. 6 includes sending (518) the second system call (512) to the second kernel (104) for execution, and providing (520) the kernel service (522) including providing (550) a response (808), all of which operate generally as described above with reference to the method of FIG. 5. In the method of FIG. 6, however, unlike the method of FIG. 5, the first kernel (102) generates the second system call (512).

The method of FIG. 6 also includes receiving (602), by the first kernel (102), the first system call (502). In the example of FIG. 6, the partition manager receives (508) the first system call (502), determines that kernel (102) provides kernel services to the application that generated the system call, and sends the system call to kernel (102).

The method of FIG. 6 also includes determining (604), by the first kernel (102), that the kernel service (522) is to be provided by the second kernel (104). Kernel (102) may determine that the kernel service (522) is to be provided by kernel (104), for example, by use of a data structure such as the one illustrated in Table 2:

TABLE 2

| Received System Call | Shared Kernel | Generated System Call |
|---|---|---|
| F(x, y, z) | 104 | F(y, x, z) |
| G(, , w) | 104 | M(w) |

Each record of Table 2 associates a received system call to a shared kernel that is to provide the kernel service identified in the system call, and specifies form and content of a system call to the shared kernel for the kernel service. If a received system call is associated with a shared kernel in such a data structure, then kernel (102) may determine that the kernel service called by the system call is to be provided by a second kernel, i.e., the shared kernel.

The method of FIG. 6 also includes generating (510), by the first kernel (102) in dependence upon the first system call (502), the second system call (512) for the kernel service (522) from the second kernel (104). Kernel (102) may generate the second system call (512) by reference to a data structure, such as the data structure illustrated in Table 2. In Table 2, received system calls have both a form, e.g., the parameters specified in the call and their order, and content, e.g., the command keyword used to invoke a function and the value of the parameters. In the first record of Table 2, for example, the form of the received call includes parameters "x, y, z" in that order and the content includes command keyword "F" and the values of x, y, and z. In the example of FIG. 6, kernel (102) is the primary kernel, because it is the kernel assigned to provide kernel services to the logical partition (114). Kernel (104) is the shared kernel in the example of FIG. 6, because it is the kernel sharing one of its services. System call (502) is the received system call in the example of FIG. 6, and second system call (512) is the generated system call. Kernel (102), upon receiving a system call from partition manager (112), may, by use of the received system call identifier, lookup in a data structure, such as Table 2, the identity of a shared kernel that provides the kernel service and the form and content required for a generated system call to the shared kernel for the kernel service. Kernel (102) may then generate the second system call (512) by forming an instruction with the appropriate keywords and parameters, in the correct form to be compatible with the shared kernel.

The method of FIG. 6 includes providing (520), by the second kernel (104), the kernel service (522), including providing (550) a response generated by the kernel service. In this example, the second kernel (104) provides to the first kernel (102), a response (808) to the second system call (512) where the response (808) has form (810) and content (812) compatible with the first kernel (102). Thus kernel (104) in this example is configured with information sufficient to allow it to formulate a response compatible with kernel (102). Alternatively, kernel (104) may provide a response having form and content compatible with kernel (104), and kernel (102) may be configured to convert that response to have form and content compatible with kernel (102). Either way, by the time the response is returned to the calling partition and the calling application, the response will have form and content compatible with kernel (102) because kernel (102) compatible return data is what the calling application is expecting.

The method of FIG. 6 also includes receiving (814) the response (808) in the first kernel (102) and sending (816) the response from the first kernel (102) to the application (108). Because response (808) in this example already has form (810) and content (812) compatible with kernel (102), sending (816) the response from the first kernel (102) to the application (108) may be carried out by passing the response without modification through kernel (102) to application (108).

Figure 7:
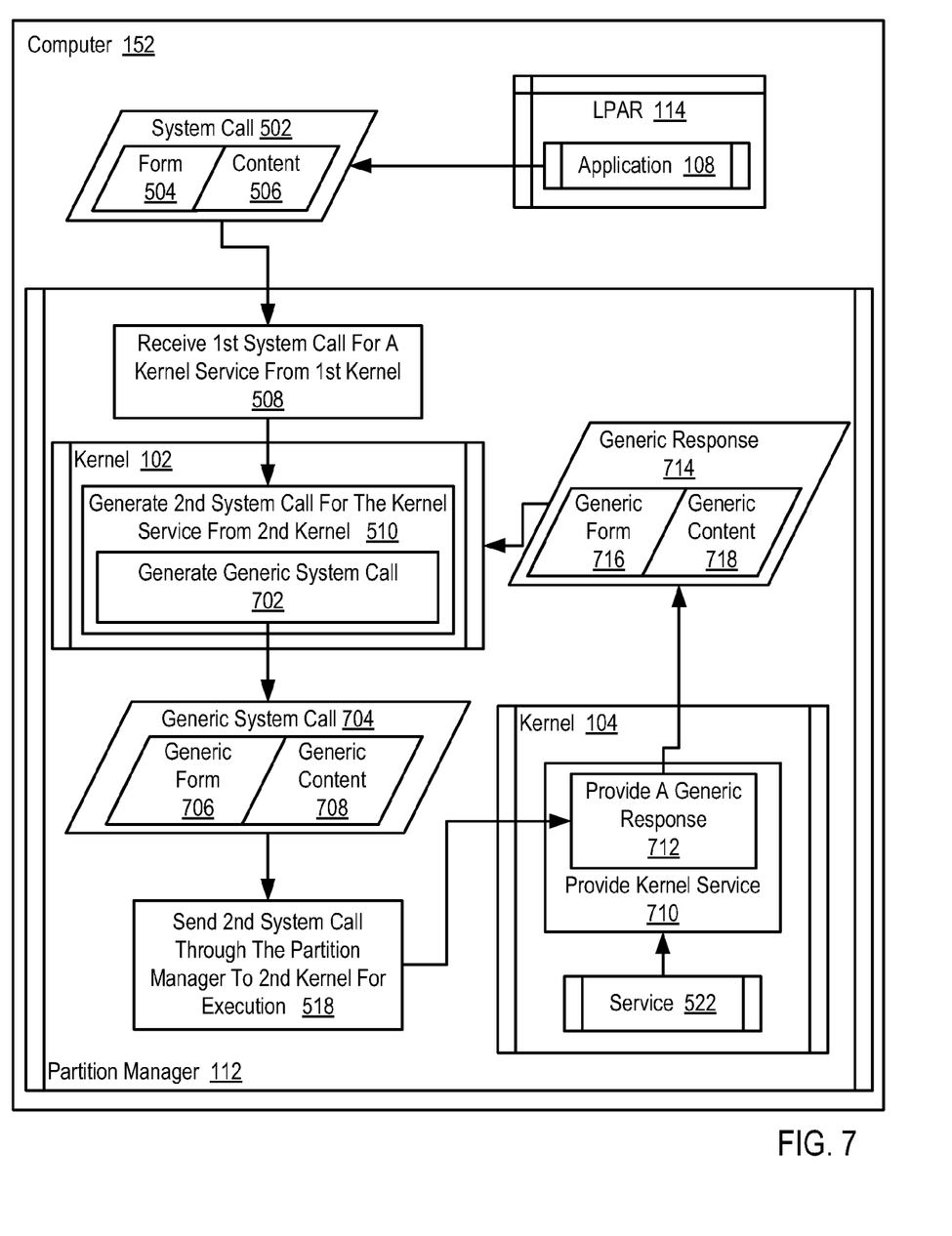
FIG. 7 sets forth a flow chart illustrating a further exemplary method for sharing kernel services among kernels according to embodiments of the present invention.

For further explanation, FIG. 7 sets forth a flow chart illustrating a further exemplary method for sharing kernel services among kernels according to embodiments of the present invention. The method of FIG. 7 is similar to the method of FIG. 5. That is, the method of FIG. 7 includes receiving (508), by the partition manager (112) from an application (108) in a logical partition (114), a first system call (502) for a kernel service (521) from a first kernel (102), the first system call having form (504) and content (506) compatible with the first kernel (102), and generating (510), in dependence upon the first system call (502), a second system call (704) for the kernel service (522) from a second kernel (104). In this example, kernel service (521) and kernel service (522) are equivalent kernel services, for example, a disk i/o request, a memory allocation request, and so on. Kernel service (521) is the form of the service as provided by kernel (102), and kernel service (522) is the form of the same service as provided by kernel (104). Kernel (102) is configured to acquire upon request the type of service represented by service (521) from kernel (104). Kernel (104) is configured to share kernel service (522) according to embodiments of the present invention.

In the method of FIG. 7, however, unlike the method of FIG. 5, the first kernel (102) generates the second system call (704). Also in the method of FIG. 7, generating (510), in dependence upon the first system call (502), a second system call for the kernel service (522) from a second kernel (104) is carried out by generating (702) a generic system call (704). The generic system call (704) in this example is a system call having generic form (706) and generic content (708). The generic form and content are a form and content accepted as compatible by a plurality of kernels, including, in this example, the second kernel (104).

The method of FIG. 7 also includes sending (518) the second, generic system call (704) to the second kernel (104) for execution. In the example of FIG. 7, the partition manager (112), having generated the second, generic system call (704), sends (518) the generic system call (704) to the second kernel (104). The partition manager may identify the second kernel (104) by reference to a data structure such as Table 1. Sending (518) the second, generic system call (704) to the second kernel (104) for execution may be carried out by use of a kernel sharing interface as described above with regard to references (124, 402, 422, 424) on FIGS. 2, 4A, and 4B.

In the method of FIG. 7 providing (710), by the second kernel (104), the kernel service (522), includes providing (712), by the second kernel (104) a generic response (714) to the generic system call (704). The generic response (714) in this example is a response having generic form (716) and generic content (718). The generic form and content are a form and content accepted as compatible by a plurality of kernels, including, in this example, the first kernel (102).

Exemplary embodiments of the present invention are described largely in the context of a fully functional computer system for sharing kernel services among kernels. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of sharing kernel services among kernels, the method implemented upon automated computing machinery comprising at least a computer processor and a computer memory operatively coupled to the computer processor, the method comprising:
   receiving, by a partition manager from an application in a logical partition, a first system call for a kernel service from a first kernel, the first system call having form and content compatible with the first kernel;
   generating, in dependence upon the first system call, a second system call for the kernel service from a second kernel, the second system call having form and content compatible with the second kernel; and
   sending the second system call through the partition manager to the second kernel for execution;
   providing, by the second kernel, the kernel service; and
   sending a response to the application in the logical partition, the response having form and content compatible with the first kernel.

2. The method of claim 1 further comprising:
   receiving, by the first kernel, the first system call; and
   determining, by the first kernel, that the kernel service is to be provided by the second kernel;
   wherein generating, in dependence upon the first system call, the second system call for the kernel service from the second kernel, comprises generating, by the first kernel in dependence upon the first system call, the second system call for the kernel service from the second kernel.

3. The method of claim 1 wherein generating, in dependence upon the first system call, the second system call for the kernel service from the second kernel comprises generating a generic system call.

4. The method of claim 1 wherein providing, by the second kernel, the kernel service includes providing by the second kernel a generic response to the second system call.

5. The method of claim 1 wherein providing, by the second kernel, the kernel service includes providing, by the second kernel to the first kernel, a response to the second system call, the response to the second system call having form and content compatible with the first kernel.

6. An apparatus for sharing kernel services among kernels, the apparatus comprising a computer processor and a computer memory operatively coupled to the computer processor, the computer memory having disposed within it computer program instructions capable of:
   receiving, by a partition manager from an application in a logical partition, a first system call for a kernel service from a first kernel, the first system call having form and content compatible with the first kernel;
   generating, in dependence upon the first system call, a second system call for the kernel service from a second kernel, the second system call having form and content compatible with the second kernel; and
   sending the second system call through the partition manager to the second kernel for execution;
   providing, by the second kernel, the kernel service; and
   sending a response to the application in the logical partition, the response having form and content compatible with the first kernel.

7. The apparatus of claim 6 further comprising computer program instructions capable of:
- receiving, by the first kernel, the first system call; and
- determining, by the first kernel, that the kernel service is to be provided by the second kernel;
- wherein generating, in dependence upon the first system call, the second system call for the kernel service from the second kernel, comprises generating, by the first kernel in dependence upon the first system call, the second system call for the kernel service from the second kernel.

8. The apparatus of claim 6 wherein generating, in dependence upon the first system call, the second system call for the kernel service from the second kernel comprises generating a generic system call.

9. The apparatus of claim 6 wherein providing, by the second kernel, the kernel service includes providing by the second kernel a generic response to the second system call.

10. The apparatus of claim 6 wherein providing, by the second kernel, the kernel service includes providing, by the second kernel to the first kernel, a response to the second system call, the response to the second system call having form and content compatible with the first kernel.

11. A computer program product for sharing kernel services among kernels, the computer program product disposed upon a computer-readable recording medium, the computer program product comprising computer program instructions capable of:
- receiving, by a partition manager from an application in a logical partition, a first system call for a kernel service from a first kernel, the first system call having form and content compatible with the first kernel;
- generating, in dependence upon the first system call, a second system call for the kernel service from a second kernel, the second system call having form and content compatible with the second kernel; and
- sending the second system call through the partition manager to the second kernel for execution;
- providing, by the second kernel, the kernel service; and
- sending a response to the application in the logical partition, the response having form and content compatible with the first kernel.

12. The computer program product of claim 11 further comprising computer program instructions capable of:
- receiving, by the first kernel, the first system call; and
- determining, by the first kernel, that the kernel service is to be provided by the second kernel;
- wherein generating, in dependence upon the first system call, the second system call for the kernel service from the second kernel, comprises generating, by the first kernel in dependence upon the first system call, the second system call for the kernel service from the second kernel.

13. The computer program product of claim 11 wherein generating, in dependence upon the first system call, the second system call for the kernel service from the second kernel comprises generating a generic system call.

14. The computer program product of claim 11 wherein providing, by the second kernel, the kernel service includes providing by the second kernel a generic response to the second system call.

15. The computer program product of claim 11 wherein providing, by the second kernel, the kernel service includes providing, by the second kernel to the first kernel, a response to the second system call, the response to the second system call having form and content compatible with the first kernel.

\* \* \* \* \*